(12) United States Patent
Rieger et al.

(10) Patent No.: US 12,415,390 B2
(45) Date of Patent: Sep. 16, 2025

(54) UTILITY VEHICLE TYRE CHAIN HAVING AT LEAST ONE CLEAT PLATE, UTILITY VEHICLE TYRE AND CLEAT PLATE FOR A UTILITY VEHICLE TYRE CHAIN

(71) Applicant: RUD KETTEN RIEGER & DIETZ GMBH U. CO. KG, Aalen (DE)

(72) Inventors: Johannes Rieger, Oberkochen (DE); Bernd Rosler, Aalen-Wasseralfingen (DE); Daniel Tafner, Graz (AT)

(73) Assignee: RUD KETTEN RIEGER & DIETZ GMBH U. CO. KG, Aalen (DE)

( * ) Notice: Subject to any disclaimer, the term of this patent is extended or adjusted under 35 U.S.C. 154(b) by 969 days.

(21) Appl. No.: 17/422,499

(22) PCT Filed: Jan. 8, 2020

(86) PCT No.: PCT/EP2020/050311
§ 371 (c)(1),
(2) Date: Jul. 13, 2021

(87) PCT Pub. No.: WO2020/148127
PCT Pub. Date: Jul. 23, 2020

(65) Prior Publication Data
US 2022/0080792 A1 Mar. 17, 2022

(30) Foreign Application Priority Data
Jan. 14, 2019 (DE) .................... 10 2019 200 350.8

(51) Int. Cl.
*B60C 27/06* (2006.01)
*B60B 15/26* (2006.01)
*B60C 27/08* (2006.01)

(52) U.S. Cl.
CPC .......... *B60C 27/068* (2013.01); *B60B 15/266* (2013.01); *B60C 27/086* (2013.01)

(58) Field of Classification Search
CPC ..... B60C 27/068; B60C 27/086; B60C 27/06; B60B 15/266
See application file for complete search history.

(56) References Cited

U.S. PATENT DOCUMENTS 1,370,758 A * 3/1921 Myers .................. B60C 27/086
152/229
1,596,633 A * 8/1926 Small .................... B60C 27/086
152/230

(Continued)

FOREIGN PATENT DOCUMENTS

| AT | 276978 | 12/1969 |
|---|---|---|
| DE | 2747025 | 4/1979 |

(Continued)

OTHER PUBLICATIONS

German Search Report, dated Aug. 8, 2019, issued in application No. 10 2019 200 350.8.

(Continued)

*Primary Examiner* — Jason R Bellinger
(74) *Attorney, Agent, or Firm* — BARNES & THORNBURG LLP; Jeffrey R. Stone

(57) ABSTRACT

A utility vehicle tire chain, in particular for forestry vehicles, tractors, or wheel loaders, has a plurality of cleat plates directly or indirectly connected to one another via chain strands, wherein each cleat plate has at least one cleat to improve traction which extends away from an upper side of the cleat plate. The solution according to the invention can simplify the manufacture of a utility vehicle tire chain and improve its stability.

14 Claims, 5 Drawing Sheets

(56) References Cited

U.S. PATENT DOCUMENTS

| | | | | |
|---|---|---|---|---|
| 1,597,596 | A | | 8/1926 | Hartfiel |
| 1,620,517 | A | * | 3/1927 | Bunger ................... B60C 27/20 152/230 |
| 1,626,788 | A | * | 5/1927 | Crawford ................ B60C 27/20 152/227 |
| 1,635,017 | A | * | 7/1927 | Sunde .................... B60C 27/08 152/239 |
| 1,763,998 | A | * | 6/1930 | Allmon .................. B60C 27/086 152/240 |
| 1,810,191 | A | * | 6/1931 | Stueckle ................. B60C 27/08 152/244 |
| 1,889,300 | A | * | 11/1932 | Thimmes .............. B60C 27/086 152/245 |
| 1,952,944 | A | | 3/1934 | Ruffertshofer |
| 2,259,189 | A | | 10/1941 | Williams et al. |
| 2,726,698 | A | * | 12/1955 | Donahue ................ B60C 27/08 152/226 |
| 3,307,604 | A | * | 3/1967 | Develey ................ B60C 27/086 152/229 |
| 3,414,037 | A | * | 12/1968 | Gower ................... B60C 27/086 152/225 R |
| 3,480,063 | A | * | 11/1969 | Grondin ................. B60C 27/08 152/230 |
| 3,714,976 | A | * | 2/1973 | Caldwell .............. B60C 27/086 D12/608 |
| 5,423,365 | A | * | 6/1995 | Labonville ............. B60C 27/08 152/239 |

FOREIGN PATENT DOCUMENTS

| | | |
|---|---|---|
| DE | 8709545 | 10/1987 |
| DE | 212004000046 | 8/2006 |
| EP | 0878331 | 11/1998 |
| FR | 901364 | 7/1945 |

OTHER PUBLICATIONS

Russian Office Action of the Substantive Examination, dated Mar. 4, 2022, in Application No. 2021120105, filed Jan. 8, 2020 and its English Translation.

Office Action issued by the Canadian Patent Office for patent application No. 3,126,319, dated Oct. 23, 2024. For informational purposes only.

* cited by examiner

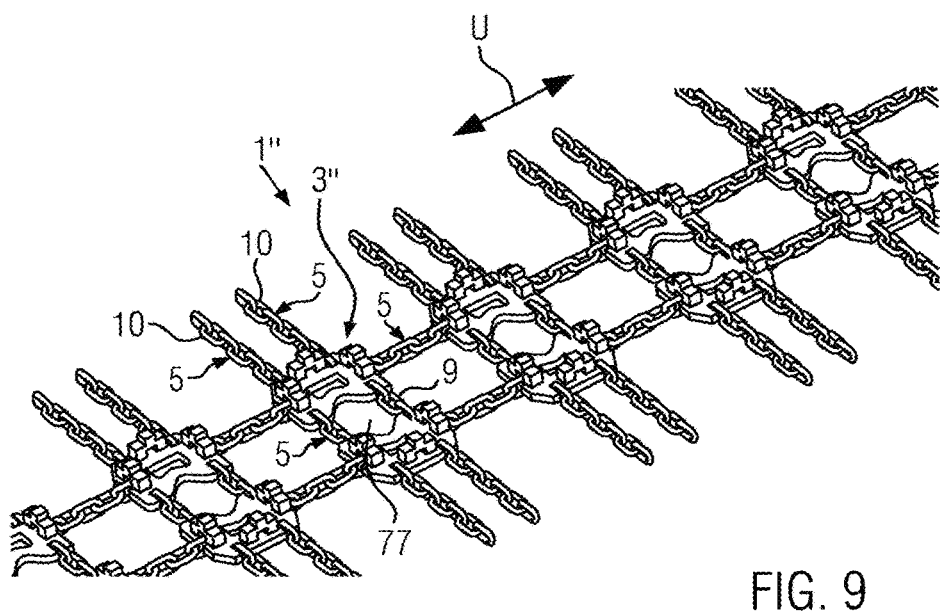
FIG. 9
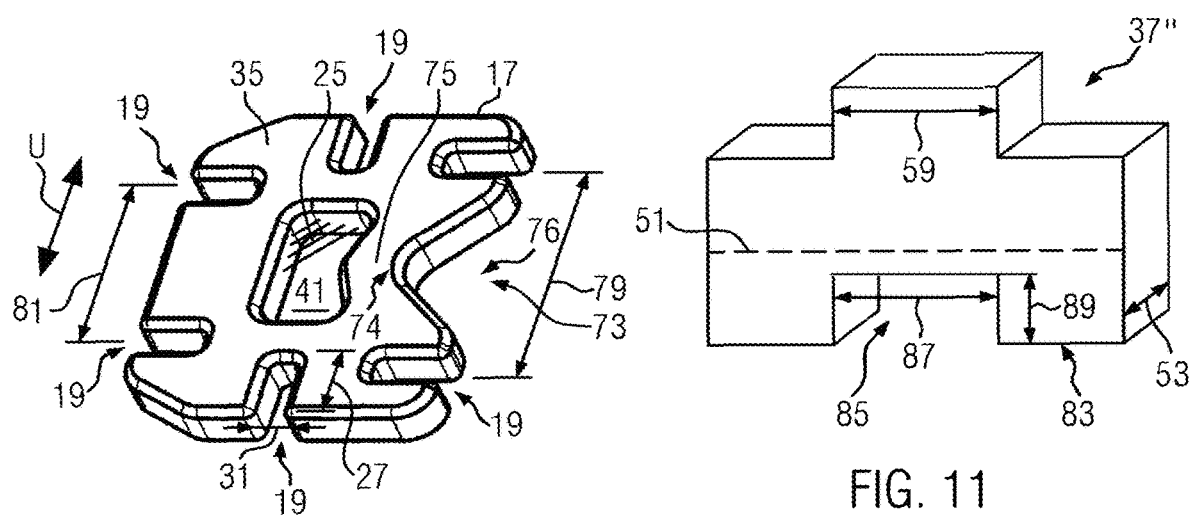
FIG. 10
FIG. 11

UTILITY VEHICLE TYRE CHAIN HAVING AT LEAST ONE CLEAT PLATE, UTILITY VEHICLE TYRE AND CLEAT PLATE FOR A UTILITY VEHICLE TYRE CHAIN

CROSS-REFERENCE TO RELATED APPLICATIONS

The present application is a national stage entry under 35 U.S.C. § 371 of International Application No. PCT/EP2020/050311, filed on Jan. 8, 2022, which claims the benefit of German Patent Application No. 10 2019 200 350.8, filed on Jan. 14, 2019. The entire content of the aforementioned applications is hereby incorporated by reference.

BACKGROUND OF THE INVENTION

The invention relates to a utility vehicle tire chain, in particular for forestry vehicles, tractors and wheel loaders. The invention additionally relates to a utility vehicle tire and a cleat plate for a utility vehicle tire chain.

In the field of forestry utility vehicles, tire chains having large rings that rest on the tire tread areas are currently used to increase traction on slippery surfaces. These rings are made from relatively strong wire having a diameter of 19 mm to over 30 mm. Due to the increased requirements with regard to the soil compaction produced by forestry utility vehicles, larger tires are increasingly being used. A larger ring has previously simply been used for larger tires. However, as the size increases, these rings are more difficult to manufacture. The heat treatment becomes problematic because of the large diameter. In addition, high forces are required for bending.

The invention is therefore based on the object of creating a utility vehicle tire chain, in particular for forestry vehicles, which is easy to manufacture despite increasingly larger tire sizes and, in particular, is also easy to scale with the tire size.

BRIEF SUMMARY OF THE INVENTION

This object is satisfied according to the invention by a utility vehicle tire chain, in particular for forestry vehicles, tractors, or wheel loaders, which comprises a plurality of cleat plates directly or indirectly connected to one another via chain strands, wherein each cleat plate comprises at least one cleat to improve traction which extends away from an upper side of the cleat plate. For the utility vehicle tire mentioned at the outset, the object according to the invention is satisfied in that the utility vehicle tire is provided with a utility vehicle tire chain according to the invention.

The above-mentioned problems of known utility vehicle tire chains can be solved by the solution according to the invention. Cleat plates are easy to manufacture. In addition, cleat plates have a good load-bearing capacity, in particular compressive strength.

The cleat plate can comprise in particular a main body which is substantially plate-shaped. In other words, the main body is formed by a plate which is flat and spans a plate plane. In particular, the main body, preferably the entire cleat plate, can be made from metal, in particular from sheet metal. The upper side of the cleat plate is the side which, when the utility vehicle tire chain is mounted, extends away from the utility vehicle tire and comes into contact with the ground. The upper side is provided with the at least one cleat. When the utility vehicle tire chain is mounted, an underside of the cleat plate opposite the upper side can rest on a tread surface of the utility vehicle tire. The underside can have a base area of the cleat plate or be identical thereto.

The solution according to the invention can be further improved by various configurations that are advantageous on their own and can be combined at random. These configurations and the advantages associated therewith shall be described below.

According to a first advantageous embodiment of the utility vehicle tire chain, at least one cleat can be welded to a plate-shaped main body of the cleat plate. A cleat can be quickly and reliably connected to the main body by welding. As an alternative or in addition thereto, at least one cleat can be screwed to the main body or attached to the main body in some other way. As an alternative to the separate manufacture of the main body and the at least one cleat with the subsequent connection of the parts, the at least one cleat can be manufactured monolithically with the main body, in particular by forging.

At least one of the cleat plates can have a rectangular, in particular a square, main body. As an alternative thereto, the main body can also be round, oval, or polygonal. The shape there does not relate to a cross-section through the plate, but rather to the two-dimensional extension of the plate which is visible when looking onto the upper side or the lower side. In other words, a base surface resting on a tire tread area in the mounted state has the respective shape.

The rectangular, in particular square shape of the main body does not rule out rounded corners. It is instead essential that the main body comprise four sides which are arranged with respect to one another substantially like the sides of a rectangle.

In order to reduce the weight of a cleat plate and/or to save material during production, at least one of the cleat plates can have a plate-shaped main body with at least one recess extending into the main body transverse to a plate plane.

According to a preferred embodiment, the recess extends through the main body. In other words, the main body has an opening or a hole that penetrates the main body. The at least one recess is preferably circular. If the cleat plate comprises a plurality of cleats, then the at least one recess is preferably arranged between these cleats, preferably at the center of the plate.

In order to connect at least one of the cleat plates in a simple and reliable manner to the chain strands, at least one of the cleat plates has a plate-shaped main body with at least two receptacles, in each of which an end link of a chain strand is received. The end links of the chain strands are preferably welded to the main body of the cleat plate. The receptacles can be formed as recesses in the plate through which the main body is open towards its sides.

As an alternative or in addition to the attachment of end links of the chain strands in the receptacles, end links can also be connected directly to the cleat plate. For this purpose, at least one end link can be welded or otherwise connected to the cleat plate, in particular to a main body of the cleat plate. In order to simplify the manufacturing process, the cleat plate, in particular its base plate, can be provided with at least one recess into which an end link can be placed. As a result, the position of the end link can be specified and the end link can be secured against slippage during the connection.

It is not necessary to connect an end link of a chain strand to a cleat plate. If at least one chain strand comprises an element which is no chain link at its end to be connected to the cleat plate, then the chain strand can be connected to the cleat plate via this element. For example, the chain strand can be provided with a ring or a shackle at one end. In this case, the ring or the shackle can then be connected to the cleat plate. Each of the aforementioned variants can be used to attach a chain strand to a cleat plate.

A cleat height, measured in particular from the upper side of the main body to the end of the cleat, preferably corresponds to at least twice the thickness of a plate-shaped main body of the cleat plate. The height of the cleat is preferably at least 40 mm, particularly preferably 50 mm to 70 mm. A thickness of the cleat preferably corresponds to the plate thickness. At least one cleat and the at least one main body can be made from the same original material. A length of the cleat is preferably at least 60 mm, particularly preferably at least 80 mm.

At least one cleat can be provided with a tip extending away from the remainder of the cleat in order to further improve traction. At least one cleat is preferably aligned parallel to one side of a rectangular main body. Particularly preferably, at least one cleat plate is provided with four cleats, wherein each of the cleats is aligned parallel to one of the sides of the rectangular shape. The cleats are there preferably spaced equidistantly from a center of the cleat plate. A recess extending preferably entirely through the main body can be arranged between the four cleats. In a top view onto the cleat plate, the cleats can have an elongate shape. Alternatively, they can also have a zigzag shape, a triangular shape, an arrow shape, or some other shape.

In order to obtain a stable cleat plate, at least one of the cleat plates can comprise a plate-shaped main body, the thickness of which is at least 15 mm, preferably 20 to 30 mm. A total height of a cleat plate, which is composed of the thickness of the main body and the height of the cleat, is preferably at least 70 mm, particularly preferably at least 90 mm. The main body is preferably formed from sheet metal. At least one cleat as well.

In order to further increase the traction, the utility vehicle tire chain can comprise at least two rows of cleat plates extending along a circumferential direction of the utility vehicle tire chain. At least two cleat plates can be arranged adjacent to one another, in other words at the same height, transverse to the circumferential direction. The at least two cleat plates can be in particular cross-connected to one another. Alternatively, a utility vehicle tire chain according to the invention can also comprise one row or more than two rows of cleat plates. If at least two rows are present, then cleat plates of the two rows can be offset from one another in the circumferential direction instead of being arranged at one height. If there are more than two rows, combinations are also possible. This means, in the case of, for example, three rows, the cleat plates of two rows can be arranged at one height in the circumferential direction. The cleat plates of the third row can be offset in the circumferential direction relative to the other cleat plates.

Each of the cleat plates can have four sides, wherein each cleat plate is connected on three sides via chain strands to at least one adjacent cleat plate and on one side to at least one side chain or one side strand, respectively.

According to one advantageous embodiment, the utility vehicle tire chain is symmetrical with respect to a plane of symmetry extending transverse to a tire axis. In an unmounted state, this plane of symmetry is perpendicular to a plane of the mesh formed from the utility vehicle tire chain and parallel to a longitudinal direction or circumferential direction of the utility vehicle tire chain. Due to the symmetrical configuration, the utility vehicle tire chain can be independent of the direction of travel. In other words, it is not necessary during assembly to ensure that a predetermined direction of travel is adhered to.

In order to reduce or avoid bending of a cleat plate under load, at least one cleat plate is preferably smaller than a tire tread area. The size of the tire tread area results from the size of the tire for which the utility vehicle tire chain is intended. It is be noted here that each utility vehicle tire chain is generally manufactured for a predetermined type of vehicle tire. The types of vehicle tires are standardized and known to the person skilled in the art.

At least one cleat can be arranged such that it bridges a receptacle for an end link or another element of a chain strand. The longitudinal side of the cleat can extend transverse to the direction along which the associated receptacle extends into the material of the main body. This direction is preferably the same direction in which the depth of the receptacle extends. The cleat thickness can substantially correspond to the depth of the receptacle. Due to the cleat bridging a receptacle, a compact structure of a cleat plate is made possible. In addition, the at least one cleat can form a protection for the receptacle that it bridges. Likewise, the at least one cleat can protect an end link received in the receptacle or another part of a chain strand received in the receptacle.

At least one cleat, which is arranged such that it bridges a receptacle, can respectively comprise on its underside a recess extending into the cleat. The underside of the cleat is the side that faces the main body. The recess has a length which preferably corresponds to at least the width of the receptacle for an end link. For the sake of simplicity, the length of the recess can be equal to the length of a tip of the cleat. In the fully mounted state, an end link of a chain strand can protrude into the recess. A height of the recess is preferably selected such that an end link arranged in the receptacle does not hit the cleat.

The invention shall be explained hereafter in more detail by way of example using advantageous embodiments with reference to the drawings. The feature combinations illustrated in the embodiments by way of example can respectively be supplemented subject to the above explanations by other features for a particular case of application. Individual features can also be omitted in the embodiment described subject to the above explanations if the effect of this feature is irrelevant in a specific case of application.

BRIEF DESCRIPTION OF THE SEVERAL VIEWS OF THE DRAWINGS

The same reference numerals in the drawings are always used for elements of the same function and/or the same structure, wherein:

FIG. 9 shows a third embodiment of a utility vehicle tire chain according to the invention with a third embodiment of cleat plates in a perspective illustration;

FIG. 10 shows a main body for a third embodiment of a cleat plate according to the invention;

FIG. 11 shows a schematic illustration of a cleat of the third embodiment; and

DETAILED DESCRIPTION OF THE INVENTION

Figure 1:
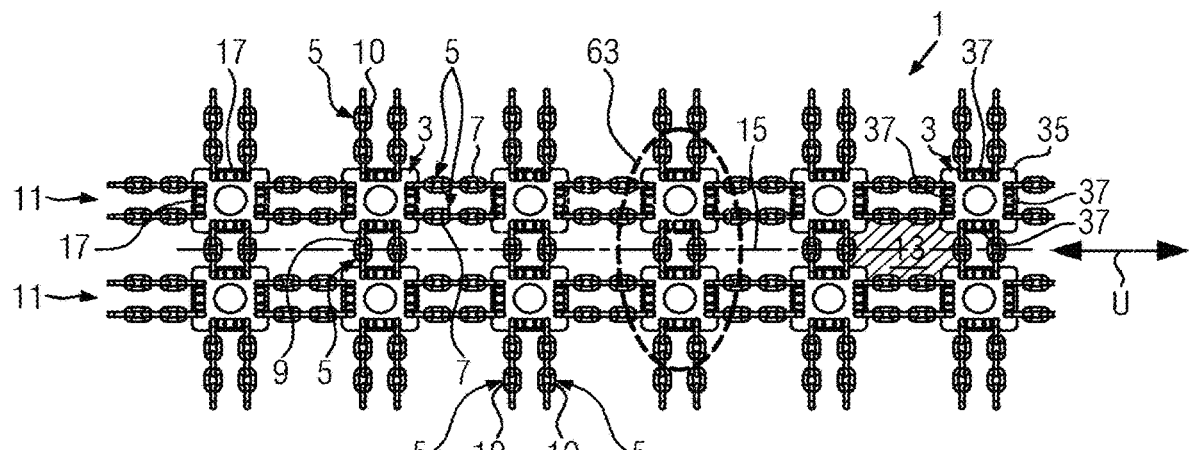
FIG. 1 shows a top view onto a part of a first advantageous embodiment of a utility vehicle tire chain according to the invention.
Figure 2:
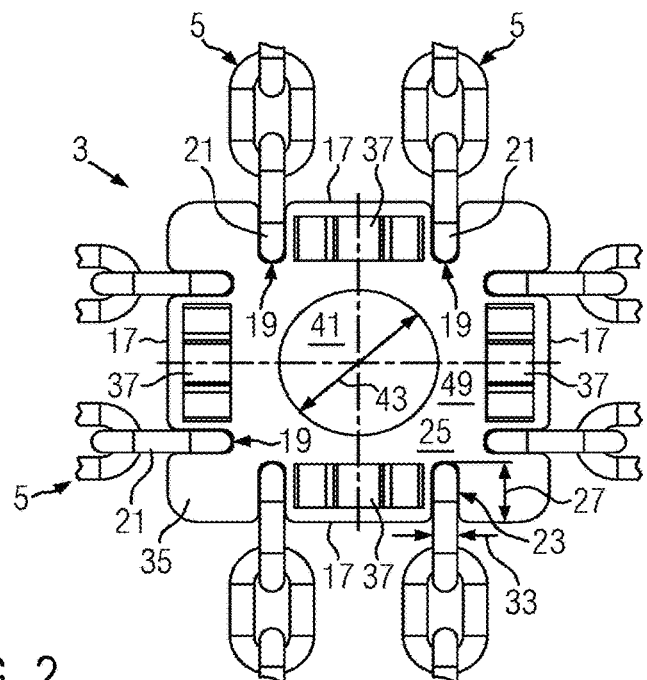
FIG. 2 shows an enlarged illustration of a cleat plate of the utility vehicle tire chain from FIG. 1.
Figure 3:
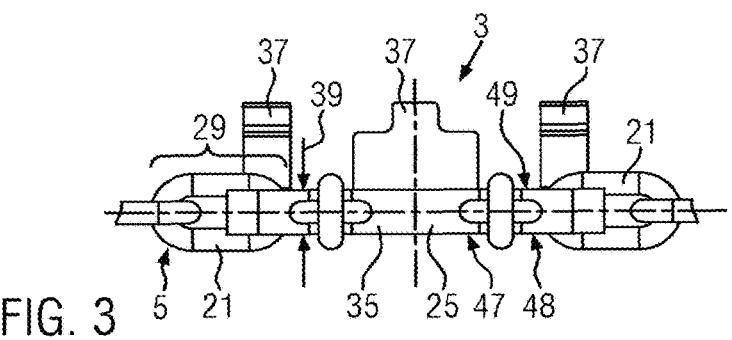
FIG. 3 shows a side view of the cleat plate from FIG. 2.
Figure 4:
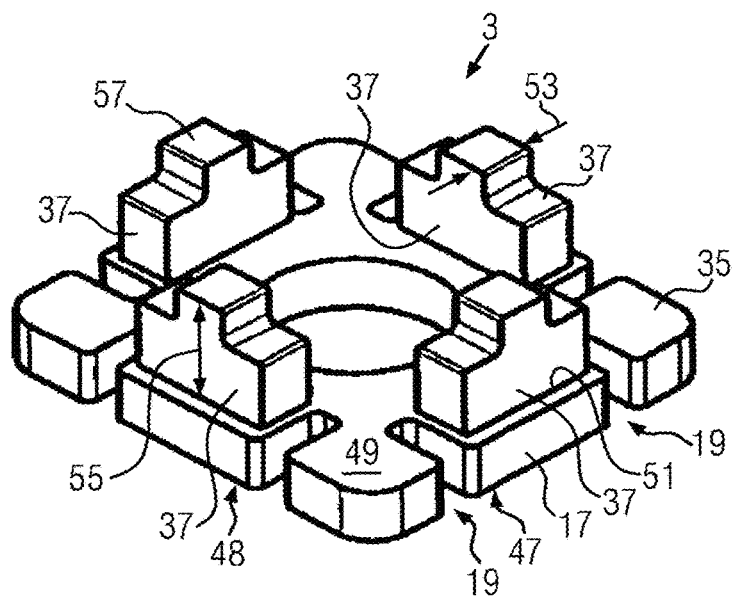
FIG. 4 shows a perspective illustration of a cleat plate of the first embodiment without chain strands.

In the following, a first embodiment of the utility vehicle tire chain according to the invention shall be described with reference to FIG. 1. The details of the cleat plates shall thereafter be discussed with reference to FIGS. 2 to 6.

Utility vehicle tire chain 1 comprises a plurality of cleat plates 3. Cleat plates 3 are connected to one another via chain strands 5. Some of chain strands 5 serve as longitudinal connections 7 which run parallel to a circumferential direction U of utility vehicle tire chain 1.

Chain strands 5 arranged transverse to circumferential direction U and between two adjacent cleat plates 3 serve as transverse connections 9 of utility vehicle tire chain 1. Further chain strands 5 running transverse to circumferential direction U serve as side strands 10 of utility vehicle tire chain 1. Cleat plates 3 can be indirectly connected to one another via side strands 10.

Utility vehicle tire chain 1 comprises two rows 11 of cleat plates 3, wherein each row 11 extends parallel to circumferential direction U. Two cleat plates 3 each from two rows 11 are arranged opposite to one another transverse to circumferential direction U. In other words, two cleat plates 3 are arranged at the same height along circumferential direction U.

Utility vehicle tire chain 1 is symmetrical with respect to a plane of symmetry 15 running parallel to circumferential direction U and perpendicular to a continuous chain mesh plane 13 spanned by utility vehicle tire chain 1. In the mounted state, plane of symmetry 15 runs transverse to a tire axis (presently not shown).

Other configurations are also possible as an alternative to the symmetrical configuration of utility vehicle tire chain 1 in which two cleat plates 3 are arranged at the same height along circumferential direction U. For example, two rows 11 could be offset from one another along circumferential direction U, wherein transverse connections 9 are then able to connect cleat plates 3 to one another in a zigzag arrangement.

Cleat plates 3 are substantially square. This means that they have longitudinal sides 17, two of which are disposed opposite to one another and run parallel to one another, and wherein two longitudinal sides 17 that are not disposed opposite to one another run perpendicular to one another.

In particular a rectangular shape, a circular shape, or a polygonal shape are possible as an alternative to the square shape. In the first embodiment, cleat plates 3 are aligned within utility vehicle tire chain 1 such that two longitudinal sides 17 each run parallel to circumferential direction U and two longitudinal sides 17 run transverse to circumferential direction U.

The structure of a cleat plate 3 according to the invention shall be described below with reference to FIGS. 2 to 6.

Cleat plate 3 comprises a total of eight receptacles 19 for end links 21 of chain strands 5. Receptacles 19 are in particular slot-shaped.

End links 21 of chain strands 5 can be inserted into receptacles 19 and welded to cleat plate 3. Consequently, end links 21 are connected by way of welded connections 23 to regions of cleat plate 3 surrounding receptacles 19. Receptacles 19 preferably extend straight from longitudinal sides 17 into the material of cleat plate 3. Each receptacle 19 preferably runs transverse to longitudinal side 17 on which it is arranged.

Receptacles 19 extend transverse to a plate plane 25 spanned by cleat plate 3 end-to-end through the material of cleat plate 3. A depth 27 of a receptacle 19, which is measured transverse to respective longitudinal side 17 and parallel to plate plane 25, is preferably about one third to two thirds, particularly preferably one third to one half, of a length 29 of end link 21. A width 31 of receptacle 19 is preferably dimensioned such that it is slightly greater than a thickness 33 of end link 29.

Figure 5:
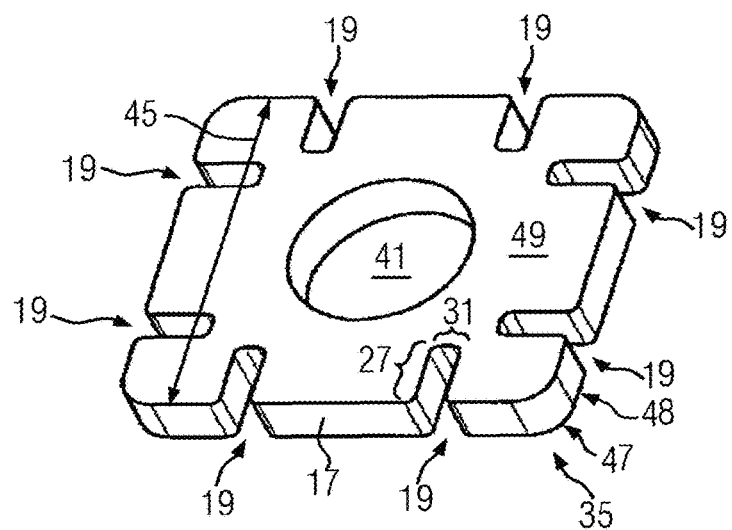
FIG. 5 shows a main body of the first embodiment of the cleat plate.
Figure 6:
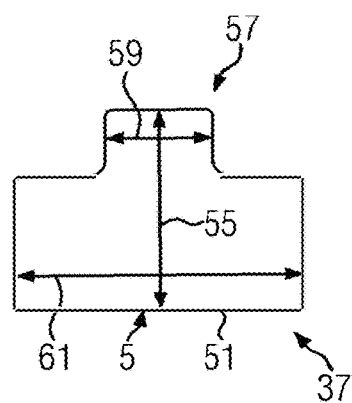
FIG. 6 shows a side view of a cleat of the first embodiment of the cleat plate.

Each cleat plate 3 preferably has a plate-shaped main body 35 and cleats 37. A main body 35 without cleats 37 is illustrated in FIG. 5. Main body 35 is preferably flat and spans plate plane 25 of a cleat plate 3. Main body 35 is preferably formed from metal, in particular from sheet metal. Main body 35 substantially determines the shape of cleat plate 3, i.e. the square shape in the example shown.

Thickness 39 of main body 35 is preferably at least 15 mm, particularly preferably 20 to 30 mm. Main body 35 is preferably provided with a hole-shaped recess 41 at its center. In this way, firstly, material can be saved during production, which reduces the costs for a cleat plate 3. Secondly, the weight of a cleat plate 3 is reduced by recess 41 so that a utility vehicle tire chain 1 equipped with cleat plates 3 can have less overall weight. As a result, the mounting on a utility vehicle tire can be simplified and the fuel consumption of the utility vehicle can be reduced.

Recess 41 extends transverse to plate plane 25 through main body 35. A diameter 43 of recess 41 is preferably smaller than half of a side length 45 of main body 35. Diameter 43 is preferably greater than a third of side length 45.

Main body 35 and cleat plate 3, respectively, have an underside 47. Cleat plate 3 can rest with underside 47 on the tread surface of a utility vehicle tire (not shown). The underside 47 is preferably flat. It therefore forms base area 48 of cleat plate 3 or of main body 35, respectively. An upper side 49 is disposed across from underside 47 transverse to plate plane 25. In a mounted state of a utility vehicle tire chain 1 on a utility vehicle tire, upper side 49 faces away from the tread surface of the utility vehicle tire.

Cleats 37 extend away from upper side 49. In particular, cleats 37 extend transverse to plate plane 25 away from upper side 49 of cleat plate 3. Cleats 37 are preferably welded to main body 35. In particular, they can be welded to upper side 49 of main body 35.

As an alternative thereto, cleats 37 can also penetrate somewhat into main body 35 or protrude therethrough. They can then be welded to main body 35 on the upper side and/or lower side 47. As an alternative to the welded connection, cleats 37 can also be connected to main body 35 in some other way. For example, cleats 37 can be connected to main body 35 by way of a screw connection.

The first embodiment of utility vehicle tire chain 1 is provided with cleat plates 3, each of which comprises four cleats 37. When viewed transverse to plate plane 25, cleats 37 have a rectangular cross-section.

Each cleat 37 is arranged close to a longitudinal side 17 of main body 35. Each cleat 37 is arranged between respective longitudinal side 17 and recess 41. Longitudinal sides 51 of cleats 37 run parallel to longitudinal sides 17 which are closest to respective cleats 37. Each cleat 37 is arranged centrally between two receptacles 19 of respective longitudinal side 17. A longitudinal side 51 of a cleat 37 can there end flush with the closed ends of receptacle 19. This can be seen, for example, in FIGS. 2 and 4. However, such an arrangement is not mandatory. Cleats 37 can also be arranged closer toward receptacle 41 or closer toward sides 17. The configuration parallel to sides 17 is also not absolutely necessary. Cleats 37 can also extend obliquely relative to sides 17.

Cleats 37 are preferably manufactured from the same material as main body 35. Cleats 37 can therefore have a cleat thickness 53 which corresponds to plate thickness 39 of main body 35. A cleat height 55, which is measured from upper side 49 to the end of cleat 37 disposed opposite upper side 49, is preferably at least twice thickness 39 of main body 35. Cleat height 55 is preferably at least 40 mm, preferably 50 to 70 mm.

At its end disposed opposite upper side 49, the cleat can be provided with a tip 57. Tip 57 can further improve the traction of utility vehicle tire chain 1. Tip 57 preferably has a length 59 which corresponds to a quarter to half of a cleat length 61. Cleat length 61 is measured parallel to longitudinal sides 51.

The size of a cleat plate 3, in particular the two-dimensional extension parallel to plate plane 25, is preferably smaller than a tire tread area 63 of a utility vehicle tire for which utility vehicle tire chain 1 is intended. When manufacturing a utility vehicle tire chain 1, the size of the utility vehicle tire for which utility vehicle tire chain 1 is intended is generally known. Consequently, the dimensions of utility vehicle tire chain 1, in particular of cleat plates 3, can be adapted. A tire tread area 63 is indicated by the dashed line in FIG. 1. For the reason that cleat plates 3 are smaller than tire tread area 63, excessive bending of cleat plates 3 can be prevented when the tire rolls.

Figure 7:
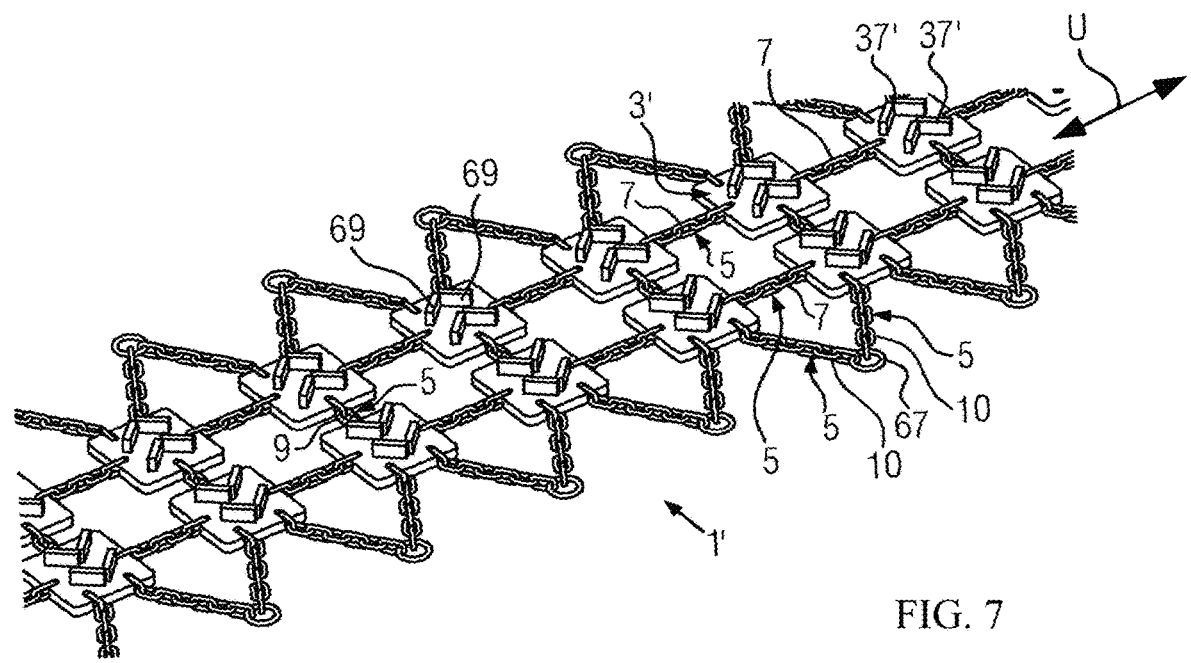
FIG. 7 shows a second embodiment of a utility vehicle tire chain according to the invention in the unmounted state in a perspective illustration.
Figure 8:
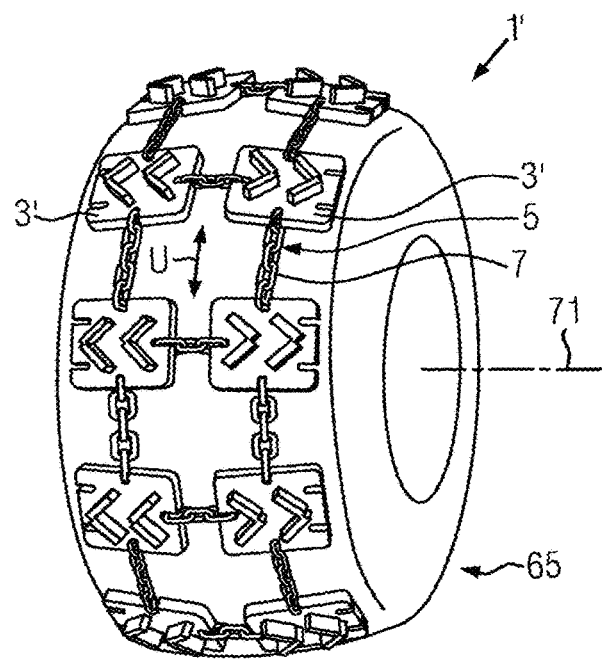
FIG. 8 shows the second embodiment of the utility vehicle tire chain in a mounted state on a utility vehicle tire.
Figure 12:
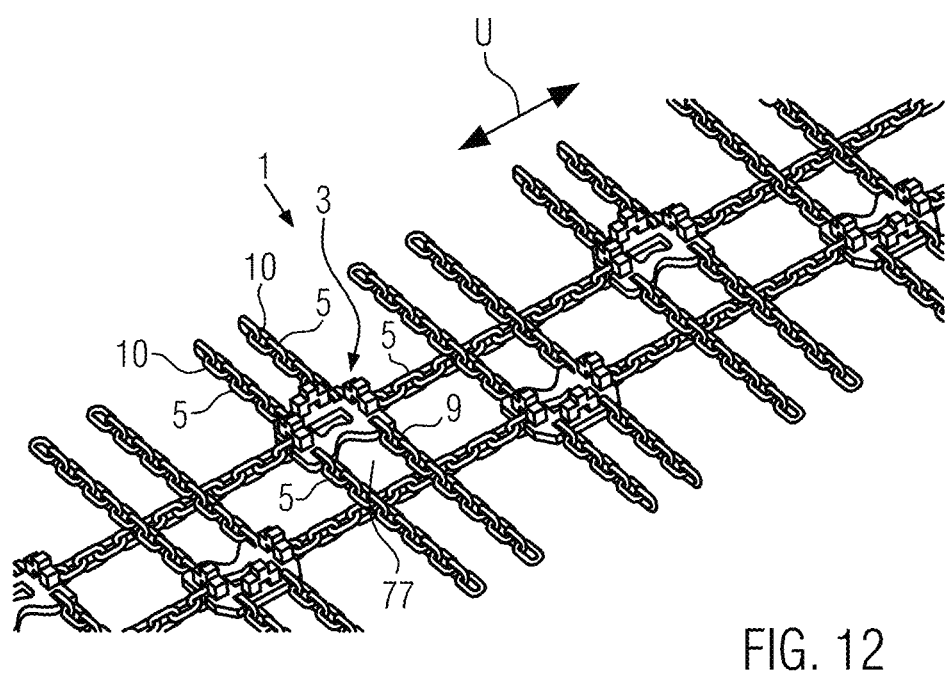
FIG. 12 shows another embodiment of a utility vehicle tire chain according to the invention with the third embodiment of cleat plates offset from one another.

A second embodiment of a utility vehicle tire chain 1 according to the invention shall be described hereafter with reference to FIGS. 7 and 8. FIG. 7 shows utility vehicle tire chain 1 in an unmounted state and FIG. 8 in a mounted state on a utility vehicle tire 65, wherein side strands 10 of utility vehicle tire chain 1 are not shown in FIG. 8 for the sake of clarity.

In the following, only the differences between utility vehicle tire chain 1 and the first embodiment described with reference to FIGS. 1 to 6 shall be discussed.

Cleat plates 3 of the second embodiment are connected to one another each with only one chain strand 5. In other words, each cleat plate 3 is connected via a respective transverse connection 9 to a cleat plate 3 that is adjacent transverse to circumferential direction U. In circumferential direction U, each cleat plate 3 is connected to a preceding and a subsequent cleat plate 3 via a respective longitudinal connection 7.

Each cleat plate 3 is connected to two side strands 10, wherein one side strand 10 each of a cleat plate 3 is connected via a ring 67 to a side strand 10 of a cleat plate 3 that is adjacent in circumferential direction U. Due to the above-described arrangement of chain strands 5, each cleat plate 3 comprises two receptacles 19 on one side for connection to side strands 10 and one receptacle 19 each on the other three sides for chain strands 5 for the direct connection to further cleat plates 3

Each cleat plate 3 is provided with two arrow-shaped cleats 37, wherein two arrow-shaped cleats 37 each point in the same direction. Each arrow-shaped cleat 37 is formed from two rectangular blocks 69 arranged at a right angle to one another. The arrow-shaped cleats each point in the direction of the closest side strands 10, so that cleats 37 of two cleat plates 3 arranged at the same height in circumferential direction U point in the opposite direction and away from one another. However, such an arrangement is not mandatory. Cleats 37 can also have other shapes than the arrow shape described above. For example, they can also have a zigzag shape, wherein such a zigzag shape can be obtained by using three blocks 69 to form a cleat 37.

Cleat plates 3 of the second embodiment can be formed without a recess 41. However, as an alternative thereto, at least recess 41 can also be present in a cleat plate 3.

In a state of the utility vehicle tire chain being mounted on utility vehicle tire 65, circumferential direction U of the tire chain can coincide with a circumferential direction of utility vehicle tire 65. Circumferential direction U then runs around an axis 71 of utility vehicle tire 65.

A third embodiment of a utility vehicle tire chain 1 according to the invention shall be described hereafter with reference to FIGS. 9 and 11. FIG. 9 shows a schematic perspective view of utility vehicle tire chain 1 in an unmounted state, FIG. 10 shows a perspective view of a main body 35, and FIG. 11 shows a perspective schematic illustration of a cleat of utility vehicle tire chain 1 from FIG. 9.

The basic structure of utility vehicle tire chain 1 consisting of cleat plates 3 and chain strands 5 corresponds substantially to the structure of the first embodiment described with reference to FIGS. 1 to 6.

For the sake of brevity, only the differences to the first embodiment of utility vehicle tire chain 1 according to the invention and its components shall be discussed below.

Cleat plates 3 of the third embodiment are each provided with three cleats 37. Cleats 37 are arranged substantially like three of four cleats 37 of the first embodiment. This means that two cleats 37 are arranged opposite one another in circumferential direction U and a third cleat 37 is disposed along circumferential direction U between the two first-mentioned cleats 37. Overall, three cleats 37 form a U-shaped arrangement, wherein three cleats 37 are spaced from one another. A recess 41 extends into or through main body 35 between three cleats 37.

Disposed opposite cleat 37, which is not disposed opposite second cleat 37 beyond recess 41, is a lateral indentation 73 in main body 35, which likewise represents a recess 41. In other words, lateral indentation 73 is located in a region between the ends of the legs of an imaginary U-shaped structure that is spanned by three cleats 37.

Lateral indentation 73 extends along plate plane 25 into main body 35 and is formed end-to-end transverse to plate plane 25. A web 75 made of the material of main body 35 extends between lateral indentation 73 and recess 41 arranged at the center of main body 35. Indentation 73 has an overall V-shape, wherein tip 74 of the V-shape points into main body 35 in the direction of centrally arranged recess 41.

Aligned within utility vehicle tire chain 1 are two juxtaposed cleat plates 3 in such a way that their lateral indentations 73 are disposed opposite one another transverse to circumferential direction U, wherein their open sides 76 are aligned toward each other. In other words, tips 74 of the V-shapes point away from one another. Indentations 73 enclose a free area 77 between them which is defined transverse to circumferential direction U by main bodies 35 and in circumferential direction U by chain strands 5 which form transverse connections 9. Free areas 77 can improve the self-cleaning of utility vehicle tire chain 1 because fouling such as mud or stones can only stick poorly in this region.

In circumferential direction U, two successive cleat plates 3 are connected to only one chain strand 5 each. Consequently, each cleat plate 3 on its longitudinal side 17 disposed in circumferential direction U comprises a receptacle 19 for an end link 21 of a chain strand 5. Cleats 37 arranged on these sides 17 are arranged such that they bridge receptacles 19. Cleats 37 run with their longitudinal sides 51 transverse to the direction in which receptacles 19 extend into the material of main body 35. This direction is the same direction in which depth 27 of receptacle 19 extends. Cleat thickness 53 can there substantially correspond to depth 27 of receptacle 19. However, this is not mandatory. Cleat thickness 53 can also be greater or smaller than depth 27 of receptacle 19. Cleats 37 bridging receptacles 19 can be aligned with those receptacles 19 which are open in the direction of cleat plate 3 that is disposed oppositely, transverse to circumferential direction U.

Receptacles 19, which are open in the direction of cleat plate 3 that is disposed oppositely, transverse to circumferential direction U, can be offset along circumferential direction U relative to receptacles 19 which are used to connect to side strands 10. In other words, receptacles 19, which open toward cleat plate 3 which is disposed oppositely, transverse to circumferential direction U, can have a greater spacing 79 from one another than two oppositely disposed receptacles 19 which serve to connect side strands 10. Last-mentioned receptacles 19 have spacing 81.

At least cleats 37, which are arranged such that they bridge a receptacle, can on their undersides 83 respectively comprise a recess 85 extending into cleat 37. Recess 85 has a length 87 which preferably corresponds to at least width 31 of a receptacle 19. For the sake of simplicity, length 87 of the recess can be equal to length 59 of the tip of cleat 37. In the fully mounted state, an end link 21 of a chain strand 5 can protrude into recess 85.

A height 89 of recess 85 is there preferably selected such that an end link 21 arranged in receptacle 19 does not hit cleat 37. Overall, a compact structure of a cleat plate 3 is possible due to cleats 37 each bridging receptacles 19. In addition, cleats 37 each form a protection for receptacle 19 which they bridge. Likewise, cleats 37 can protect an end link 21 received in receptacle 19 or another part of a chain strand 5 received in receptacle 19.

REFERENCE NUMERALS 1 utility vehicle tire chain
3 cleat plate
5 chain strand
7 longitudinal connection
9 transverse connection
10 side strand
11 row of cleat plates
13 continuous chain mesh plane
15 plane of symmetry
17 longitudinal side
19 receptacle for end link
21 end link
23 welded connection
25 plate plane
27 depth of receptacle
29 end link
31 width of the receptacle
33 thickness of the end link
35 main body
37 cleat
39 thickness of the body
41 recess
43 diameter
45 side length of the main body
47 underside
48 base area
49 upper side
51 longitudinal sides of the cleat
53 cleat thickness
55 cleat height
57 tip
59 length of tip
61 cleat length
63 tire tread area
65 utility vehicle tire
67 ring
69 block
71 axis of the utility vehicle tire
73 lateral indentation
74 tip
75 web
76 open side
77 free area
79 spacing
81 spacing
83 underside
85 recess
87 length of the recess
89 height of the recess
U circumferential direction

The invention claimed is:

1. A utility vehicle tire chain, which comprises a plurality of cleat plates directly or indirectly connected to one another by chain strands, wherein each cleat plate comprises at least one cleat to improve traction which extends away from an upper side of said cleat plate, wherein at least one of said cleat plates has a plate-shaped main body with at least one recess extending transverse to a plate plane into said main body.

2. The utility vehicle tire chain according to claim 1, wherein at least one cleat is welded to a plate-shaped main body of said cleat plate.

3. The utility vehicle tire chain according to claim 1, wherein at least one cleat is monolithically formed with a plate-shaped main body of said cleat plate.

4. The utility vehicle tire chain according to claim 1, wherein at least one of said cleat plates has a rectangular main body.

5. The utility vehicle tire chain according to claim 1, wherein at least one of said cleat plates has a plate-shaped main body with at least two receptacles, in each of which an end link of a chain strand is received.

6. The utility vehicle tire chain according to claim 1, wherein a cleat height corresponds to at least twice the thickness of a plate-shaped main body of said cleat plate.

7. The utility vehicle tire chain according to claim 1, wherein at least one of said cleat plates has a plate-shaped main body, the thickness of which is at least 15 mm.

8. The utility vehicle tire chain according to claim 1, wherein said utility vehicle tire chain comprises at least one, row of cleat plates extending along a circumferential direction of said utility vehicle tire chain.

9. The utility vehicle tire chain according to claim 8, wherein said utility vehicle tire chain comprises at least two rows of cleat plates and wherein at least two cleat plates are arranged adjacent to one another transverse to said circumferential direction.

10. The utility vehicle tire chain according to claim 8, wherein said utility vehicle tire chain comprises at least two rows of cleat plates and wherein at least two cleat plates are arranged offset from one another in said circumferential direction.

11. The utility vehicle tire chain according to claim 1, wherein said utility vehicle tire chain is symmetrical with respect to a plane of symmetry extending transverse to a tire axis.

12. The utility vehicle tire chain according to claim 1, wherein at least one cleat plate is smaller than a tire tread area of a utility vehicle tire.

13. A utility vehicle tire with a utility vehicle tire chain according to claim 1.

14. A cleat plate for a utility vehicle tire chain according to claim 1.

\* \* \* \* \*